(12) United States Patent
Narayanan et al.

(10) Patent No.: US 10,705,024 B2
(45) Date of Patent: Jul. 7, 2020

(54) SYSTEM AND METHOD FOR POSITIVE METAL IDENTIFICATION AND INTELLIGENT CONSUMABLE IDENTIFICATION

(71) Applicant: Lincoln Global, Inc., Santa Fe Springs, CA (US)

(72) Inventors: Badri Narayanan, Highland Heights, OH (US); John Procario, Strongsville, OH (US); Michael Kottman, Cleveland, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 584 days.

(21) Appl. No.: 15/462,439

(22) Filed: Mar. 17, 2017

(65) Prior Publication Data
US 2018/0266961 A1    Sep. 20, 2018

(51) Int. Cl.
| | |
|---|---|
| *G01N 21/71* | (2006.01) |
| *B23K 9/10* | (2006.01) |
| *B23K 9/095* | (2006.01) |
| *B23K 31/12* | (2006.01) |
| *G06T 11/20* | (2006.01) |
| *G01N 21/01* | (2006.01) |
| *G01N 21/84* | (2006.01) |

(52) U.S. Cl.
CPC ......... *G01N 21/718* (2013.01); *B23K 9/0953* (2013.01); *B23K 9/0956* (2013.01); *B23K 9/1062* (2013.01); *B23K 9/1093* (2013.01); *B23K 31/12* (2013.01); *G01N 2021/0118* (2013.01); *G01N 2021/8416* (2013.01); *G01N 2201/0221* (2013.01); *G06T 11/206* (2013.01); *G06T 2200/24* (2013.01)

(58) Field of Classification Search
CPC .... B23K 31/12; B23K 9/0953; B23K 9/0956; B23K 9/1062; B23K 9/1093; G01N 2021/0118; G01N 2021/8416; G01N 21/718; G01N 2201/0221; G06T 11/206; G06T 2200/24
USPC .......... 219/130.21, 74, 121.54, 130.1, 130.5, 219/137 PS
See application file for complete search history.

(56) References Cited

U.S. PATENT DOCUMENTS

| | | |
|---|---|---|
| 4,392,044 A | 7/1983 | Wang |
| 5,202,837 A | 4/1993 | Coe |

(Continued)

FOREIGN PATENT DOCUMENTS

| | | |
|---|---|---|
| GB | 2 151 777 A | 7/1985 |
| RO | 127336 B1 * | 5/2015 |

OTHER PUBLICATIONS

Hobart Filler Metals; "Aluminum Filler Metal Selection Chart"; Guide for Aluminum Welding, Dated Jun. 30, 2013; pp. 1-6.

(Continued)

*Primary Examiner* — Dana Ross
*Assistant Examiner* — Ket D Dang

(57) ABSTRACT

Embodiments of the present invention are directed to systems and methods of predicted a welding property for a given welding operation using at least one electrode. Embodiments determine a predicted weld deposit property and compare the predicted property to a desired property to determine whether or not a selected electrode for the given welding operation can achieve the desired weld deposit.

11 Claims, 6 Drawing Sheets

(56) References Cited

U.S. PATENT DOCUMENTS

| | | | | |
|---|---|---|---|---|
| 6,060,685 A | * | 5/2000 | Chou | B23K 26/032 |
| | | | | 219/121.83 |
| 6,560,500 B2 | | 5/2003 | Ville | |
| 7,194,447 B2 | | 3/2007 | Harvey | |
| 7,203,628 B1 | | 4/2007 | Ville | |
| 8,301,286 B2 | | 10/2012 | Babu | |
| 8,592,722 B2 | | 11/2013 | Ulrich | |
| 9,221,117 B2 | | 12/2015 | Conrardy | |
| 9,776,275 B2 | | 10/2017 | Blankenship | |
| 9,808,879 B2 | | 11/2017 | Adonyi | |
| 2008/0142700 A1 | * | 6/2008 | Dahl | G01N 27/622 |
| | | | | 250/286 |
| 2012/0037600 A1 | | 2/2012 | Katoh | |
| 2012/0138586 A1 | * | 6/2012 | Webster | A61B 18/20 |
| | | | | 219/121.64 |
| 2013/0092667 A1 | | 4/2013 | Peters et al. | |
| 2015/0106035 A1 | | 4/2015 | Vecchio | |

OTHER PUBLICATIONS

American Welding Society; "Tensile Properties of Gas Tungsten Arc Weldments in Ductile Iron"; Welding Handbook—vol. 4; Dated Dec. 31, 2011; p. 544.
Extended European Search Report from Corresponding Application No. 18162581.5; dated Sep. 13, 2018; pp. 1-10.

* cited by examiner

TOUGHNESS, FT - LB @ -40° F

| BASE MATERIAL | ELECTRODE ALLOY | | | | | |
| --- | --- | --- | --- | --- | --- | --- |
| | A | B | C | D | E | F |
| 1 | 127 | 108 | 152 | 117 | 53 | NA |
| 2 | 22 | 26 | 73 | 72 | 18 | 33 |
| 3 | 20 | 15 | 26 | 42 | 19 | NA |
| 4 | 22 | 22 | 21 | 35 | 23 | NA |
| 5 | 123 | 138 | 122 | 116 | 56 | NA |
| 6 | 68 | 65 | 71 | 107 | 71 | NA |
| 7 | 35 | 49 | 20 | 21 | 25 | 117 |
| 8 | 29 | 23 | 32 | 32 | 25 | NA |
| 9 | 20 | 15 | 17 | 28 | 29 | NA |
| 10 | 38 | 38 | 32 | 43 | 33 | NA |
| 11 | 29 | 41 | 41 | 53 | 22 | NA |

FIG. 9

SYSTEM AND METHOD FOR POSITIVE METAL IDENTIFICATION AND INTELLIGENT CONSUMABLE IDENTIFICATION

TECHNICAL FIELD

Devices, systems, and methods consistent with the invention relate to welding, and more specifically to devices, systems and methods related to positive weld metal identification and intelligent consumable identification.

BACKGROUND

In many welding applications, the properties and composition of the weld joint metal can be a combination of the base metal or workpiece metal and the welding consumable. For example, in some applications the weld joint metal can be as much as 50-50 admixture of base metal and consumable. This can significantly affect the strength, durability and physical properties of the resulting weld. Thus, the selection of the proper consumable can be important to the resulting weld. In such instances the selection of the proper consumable is important, but should be based on the base metal composition. In many applications it is difficult for a welder to determine the composition of the base metal to then identify the proper consumable. Further, even if the base metal composition is known, a welder may not know the exact composition of the consumables available, and thus could have difficulty identifying the proper consumable to achieve the desired weld metal composition. Thus, it is important to select the proper consumable for a given welding operation and a given base metal.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a method and system of using a positive metal identification tool to properly identify the composition of the base metal and communicate that information to a power supply controller or other computer processor. Further, positive identification of a consumable is made via entry or scanning of data. Based on the base metal and consumable data the computer/controller determines resultant weld properties from the weld and provides an indication to the user of the likely resultant weld properties.

BRIEF DESCRIPTION OF THE DRAWINGS

The above and/or other aspects of the invention will be more apparent by describing in detail exemplary embodiments of the invention with reference to the accompanying drawings, in which:

FIG. 9 is a diagrammatical representation of an exemplary look up table structure according to an embodiment of the present invention.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to welding systems and welding processes. Specifically, embodiments of the present invention are directed to welding systems such as GMAW, GTAW, SMAW, SAW, FCAW etc. It is noted that to the extent any specific welding operation type is discussed herein in the embodiments below, the discussion thereof is intended to be exemplary and not limiting to other exemplary embodiments of the present invention.

Figure 1:
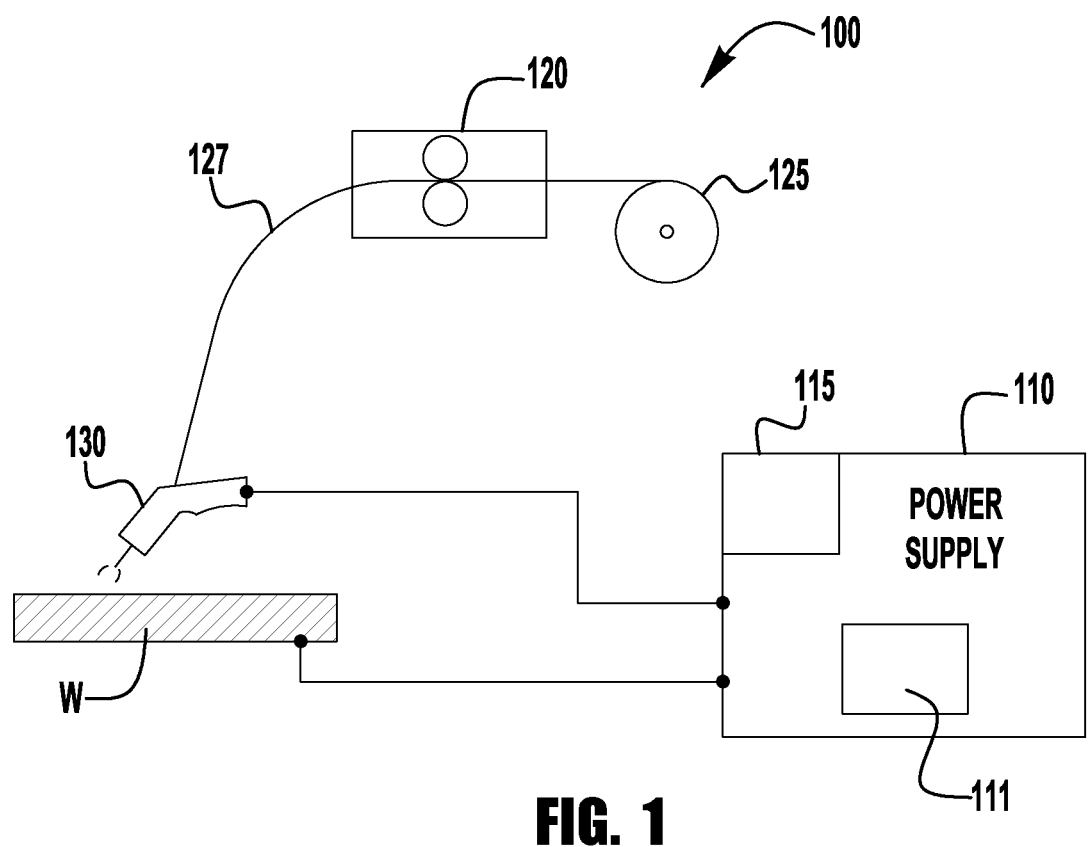
FIG. 1 is a diagrammatical representation of an exemplary welding system of the present invention.

Turning now to FIG. 1, an exemplary welding system of the present invention. The welding system 100 comprises a welding power supply 110 having a processor based controller 115 and a user interface/display 111. The power supply can be any type of known welding power supply, and embodiments of the invention are not limited thereto. For example, the power supply 100 can be a PowerWave, as manufactured by The Lincoln Electric Company of Cleveland, Ohio, although embodiments are not limited thereto. Because of the manufacture, construction and operation of such power supplies, with powerful and sophisticated controllers are known, they need not be described in detail herein. The controller 115 can be any known processor based controller cable of controlling the operation of the welding system, and can have a CPU, memory, etc. The display 111 can be any known type of display that displays operational data related to a welding operation, user input data and the like. The display can also be a touch screen type allowing user input data to be input via the screen 111.

The system 100 can also comprise a consumable source 125 from which a consumable 127 is supplied to a welding operation via a wire feeder 120, the operation of which is known. The wire 127 is delivered to a welding torch 130 of any known type foe the welding of a workpiece or the weld metal W. Because welding operations are widely known, they will not be described in detail herein.

Figure 2:
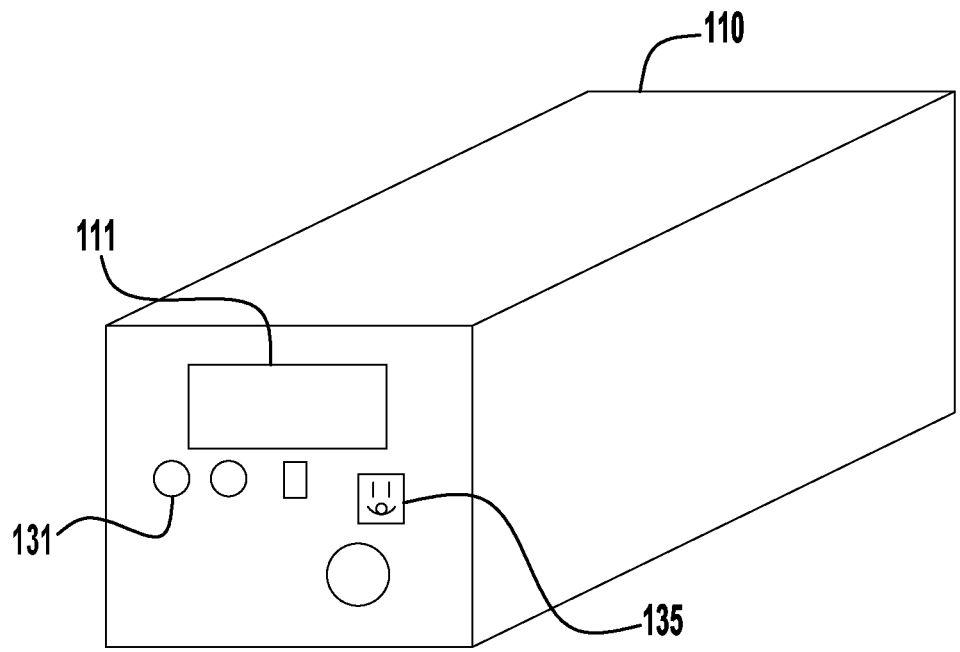
FIG. 2 is a diagrammatical representation of an exemplary welding power supply of the present invention.

FIG. 2 is another depiction of the exemplary power supply 110 with the user display 111. The power supply 110 can also have various user input controls 131, auxiliary output power 135 and the like.

Figure 3:
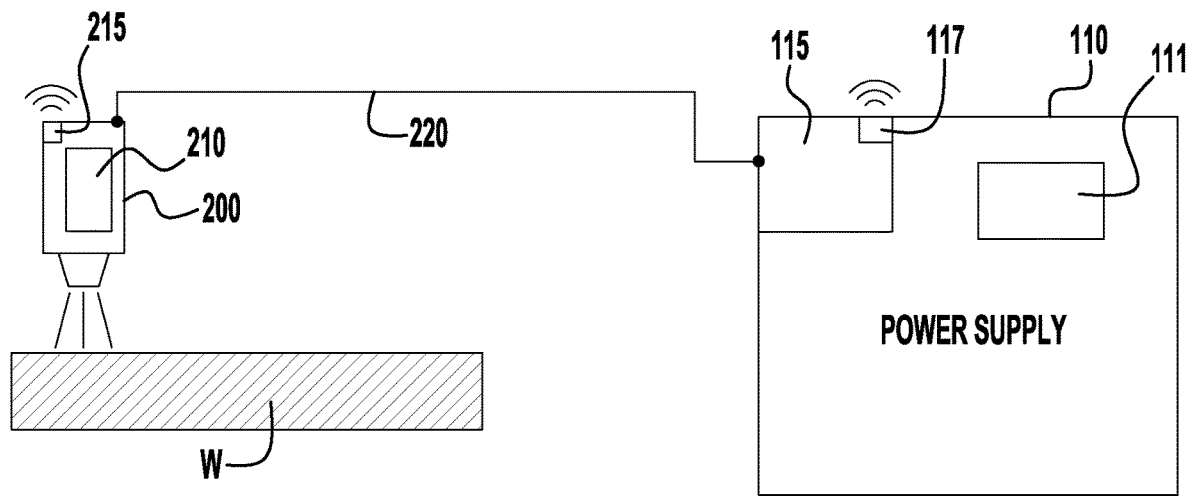
FIG. 3 is a diagrammatical representation of an exemplary weld metal scanning system of the present invention.

FIG. 3 depicts an exemplary workpiece composition scanning system of the present invention. As shown, a spectrometer 200 is used to scan the workpiece/weld metal to be welded. The spectrometer 200 can be any known type of spectrometer that can scan the weld metal. The spectrometer can be of the handheld type, or other known types. For example, the spectrometer 200 can be a spectrometer found at https://www.oxford-instruments.com/products/analysers/handheld-analysers/libs-analyzer-mpulse-series. The spectrometer 200 can have a screen 210 to display compositional data for the workpiece. In some exemplary embodiments the spectrometer 200 is coupled via a communication connection 220 to the controller 115 of the power supply 110 to directly transfer the spectrometer/composition data to the controller 115. In other exemplary embodiments, the spectrometer 200 contains at least a transmitter 215 which can wirelessly transmit the composition data to the controller 115 which has a receiver/transmitter 117 capable of being linked for communication with the transmitter 215 of the spectrometer 200. For example, the communication link can be via Bluetooth, or other known communication technologies, such as via a cellular or Wi-Fi link, etc. In other embodiments, the spectrometer can store and recall the composition data for display such that a user can manually enter the data into the power supply 110 via the interface. In other embodiments, the spectrometer 200 can have a communication connection port such as USB, or the like such that the spectrometer 200 can be connected to a corresponding port on the power supply 10 to transmit the data.

Thus, during operation a user uses the spectrometer 200 to scan the workpiece W to be welded prior to welding. Typically, the user should make sure that a surface of the workpiece W is cleaned and appropriate coating, rust, etc. is removed such that the composition data properly reflects the material to be welded. In some exemplary embodiments the spectrometer 200 is used to scan each workpiece to be welded. Typically, at least two workpieces are joined, and the spectrometer can be used to ensure that they are of the same material, having similar compositions. That is, the user can use the spectrometer 200, via the display, to ensure that the workpieces are similar and can be joined. Further, this data can be transmitted/uploaded to the power supply controller 115 and the controller 115 can analyze the data to ensure that the workpieces are similar and/or can be joined. In other embodiments, only one workpiece composition data is captured. As indicated above, this composition data is transmitted/provided to the controller 115 which receives and stores the data for use, as explained further below.

Figure 4:
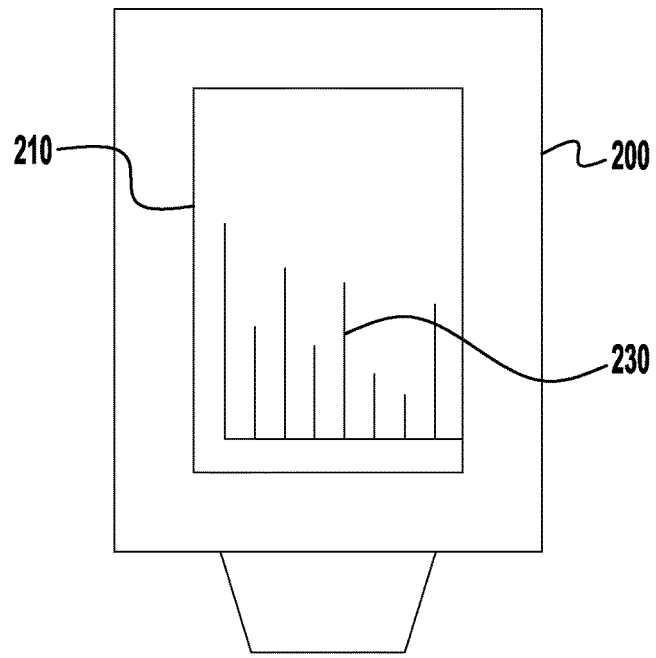
FIG. 4 is a diagrammatical representation of an exemplary spectrometer that can be used with embodiments of the present invention.

FIG. 4 depicts an exemplary embodiment of the spectrometer 200 having a display 210. The spectrometer 200 can use various methodologies to determine the workpiece composition. For example, the spectrometer can be a scan type, a contact type, etc. The display 210 can be used to visually display composition information 230, which can include, for example, nickel content, iron content, etc. This compositional information is supplied to the controller 115 of the power supply via the communication link, or manual entry by the user via the interface 111.

Figure 5:
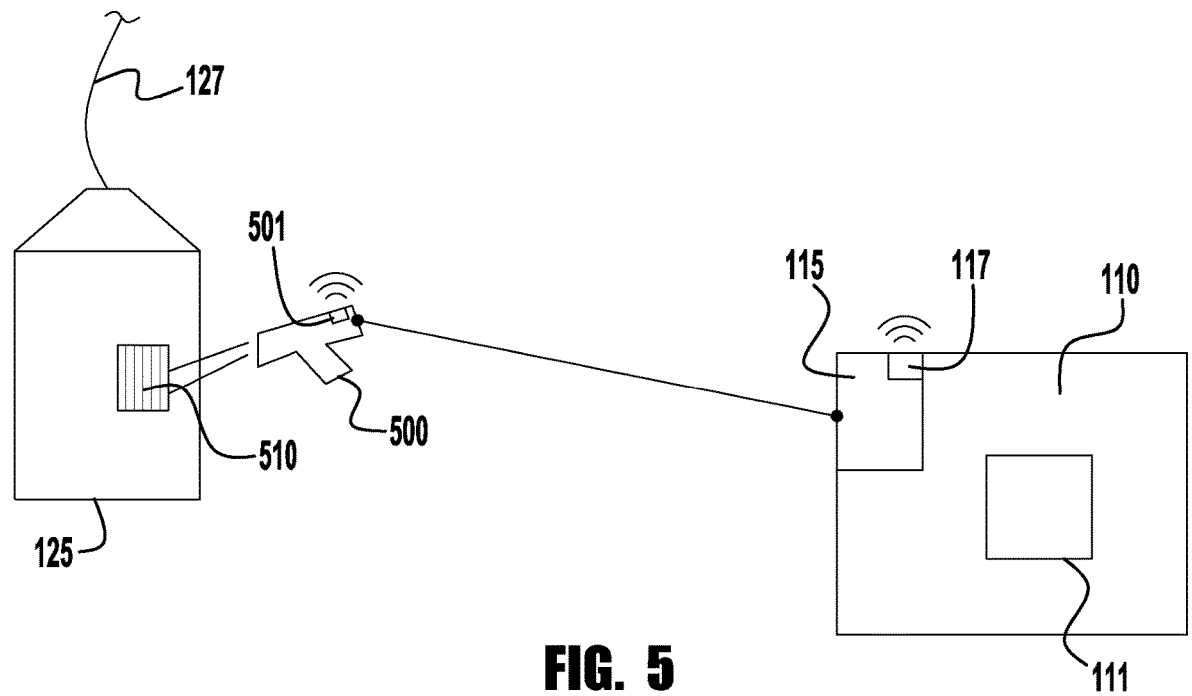
FIG. 5 is a diagrammatical representation of an exemplary embodiment of a consumable scanning system of the present invention.

FIG. 5 depicts another exemplary aspect of the present invention. As depicted, a consumable 127 is provided from a consumable source 125, such as a consumable package. The consumable package 125 can be any known type of package, such as a reel, spool, box, bulk package or the like. The packaging 125 has an identifier 510, which can be any known type of identifier which can be used to identify the consumable 127 in the package. For example, the identifier can be a UPC symbol, QR code, bar code, serial number, etc. and can also be an identifier such as an RFID tag, etc. The identifier 510 can be used to identify the consumable type, and at least some aspects of the consumable composition. In some systems a scanner 500 can be used to scan the identifier 510. The scanner 500 can be coupled via wired or wireless connection to the controller 115, for example the scanner 500 can have a transmitter 501 that couples wirelessly to the controller 115 to transmit the scanned data to the controller 115. The scanned data from the identifier 510 identifies a specific consumable type that is recognized by the controller 115. The controller 115 can contain a database or lookup table that corresponds composition/construction and/or type of the consumable 127 to the scanned data from the identifier 510. Thus, once received by the controller, the identification data from the identifier is used to look up the consumable data stored in the controller 115. It is noted that in other embodiments, the user can simply manually enter the identification of the consumable, such as with a serial number, etc.

The controller 115 then uses each of the scanned material composition, the consumable information from its look up table, and at least some user information to determine at least one property of a completed weld using the consumable with the weld metal composition scanned. For example, using the input information the controller 115 determines properties such as weld toughness, yield strength etc. of a weld to be completed using the input data—e.g., spectrometer data, consumable data and some weld process data.

Figure 6:
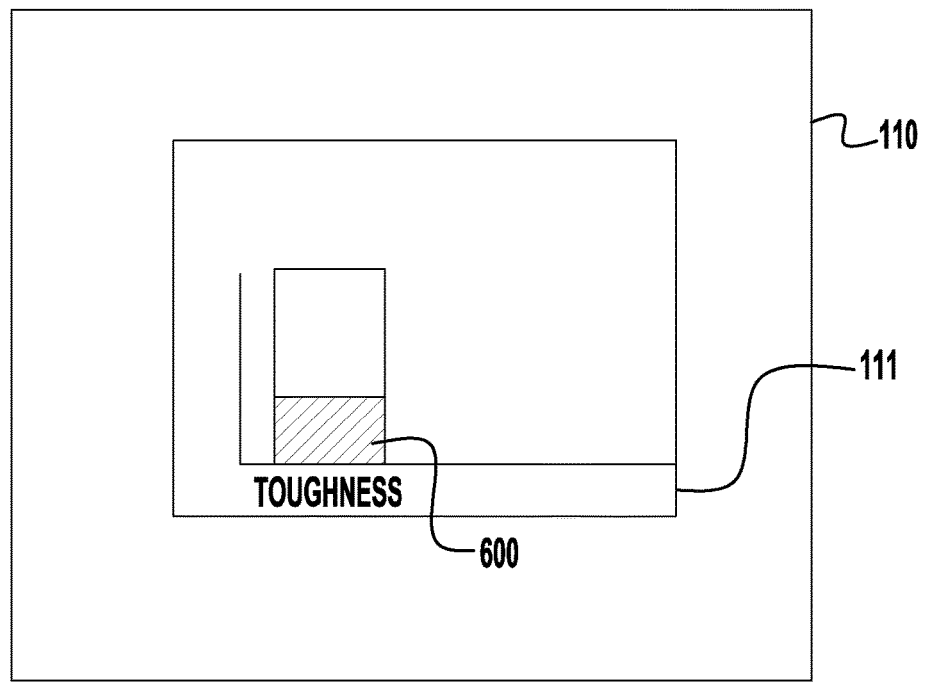
FIG. 6 is a diagrammatical representation of an exemplary display of the present invention.

FIG. 6 depicts an exemplary display 111 on the power supply 110 which displays a predicted weld property 600. As shown a predicted weld toughness is displayed to provide the welder with guidance as to the expected weld toughness when completing a weld taking into account at least one weld process property, the workpiece composition and the consumable to be used. For example, the display can provide a colored indication, where a red indicator indicates poor weld toughness, a yellow indicator indicates a moderate weld toughness and a green indicator to indicate an optimal or desired weld toughness. This information can be displayed in a number of different ways. For example, an indicator bar can be displayed providing an indication of maximum possible toughness and a second indicator indicating a predicted toughness in relation to the maximum possible level. This allows a user to make an informed decision regarding the consumable being used in the welding process to achieve the desired weld deposit parameter.

In exemplary embodiments, the controller 115 can have a look up table preprogrammed with predicted weld deposit characteristics based on various combinations of base metal, consumable and weld process characteristics. When the information is received by the controller 115 the look up table is consulted to determine an anticipated weld deposit property, and this information is displayed. In other exemplary embodiments, the controller 115 has a determined admixture percentage for a given weld process type and/or weld parameters. Based on determined level of admixture the controller 115 can use the material composition from each of the workpiece and the consumable and can determine the final composition of the weld bead, and using that weld bead information can determine a property of the weld bead. This will be explained further below.

Figure 7:
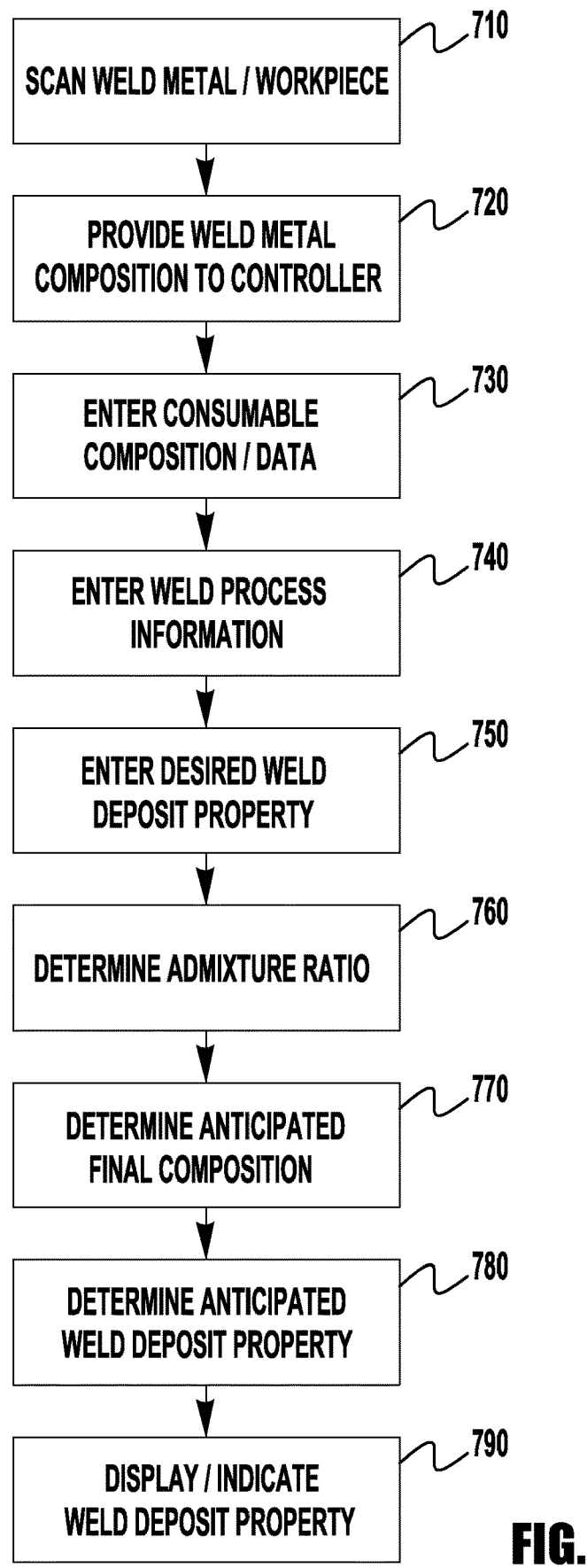
FIG. 7 is a diagrammatical representation of a flow chart of an exemplary embodiment of the present invention.

FIG. 7 depicts an exemplary flow chart for an exemplary process as described herein. At 710 the workpiece or weld metal is scanned with the spectrometer, and the weld metal composition is entered to the processor 720. The workpiece composition can be entered manual or automatically via a communication link between the spectrometer and the controller. Then the consumable data, which can include the consumable composition is entered into the controller 730. Again, this can be done manually, by actually entering the consumable composition information, or via the use of a serial number or part number that is recognized. Alternatively, the consumable composition can be entered to the controller using a scanned identifier tag as previously discussed. With the specific identifier corresponding to a specific consumable, the controller can use a look up table or the like to pull up the composition data or the specific consumable so that information can be used by the controller. Then weld process information can be entered 740. The weld process information can be entered by the user via the user interface or any input controls on the power supply. The weld process information can include any one, all or a combination of the weld process type (GMAW, SMAW, tandem, etc.); number of weld passes; deposition rate; wire diameter; wire feed speed; heat input; number of consumables; flux type (if not part of the consumable); shield gas; workpiece thickness, weld joint dimensions, weld joint type, weld joint design, weld process parameters (such as amperage, voltage, travel speed, etc.), or other user inputs to define an aspect of the weld. It is noted that the controller can have pre-stored welding information for a given process. That is a user need only select "welding process 1" which will have certain preset welding process parameters associated with it. Of course these parameters can be customized as needed for a given process or user's needs. Then a desired weld bead property can be entered into the controller 750. For example a desired weld toughness, yield strength, tensile strength, etc. can be entered by a user. Alternatively, the desired weld properties can be associated with a specific weld process that is preprogrammed or otherwise stored in the controller. In other exemplary embodiments, the user can not only define the desired weld bead property level (toughness level, strength level, etc.) but the user can also define an acceptable level or a minimal level. Thus, for example, with these additional levels, the display can display green if the determined weld bead parameter will be at our above the desired level, display yellow if the determined weld bead parameter will be at or above the acceptable/minimal level, but below the desired level, and display red if the parameter will be below the acceptable level.

Of course, it should be noted that while the steps 710 through 750 discussed above and shown in FIG. 7 are displayed in a particular order, embodiments are not limited in this way. Specifically, the order of data entry into the controller can occur in any order. That is, the order of 710 through 750 shown in FIG. 7 can occur in any order and embodiments are not limited thereto.

With the above welding process data 740 the controller than determines the expected admixture of the final weld deposit. That is the controller than determines the ratio of workpiece material to the consumable material. For example, for a given process the controller can determine that the weld process will provide a 50-50 admixture, or 50% of the final bead will be workpiece material and 50% will be from the consumable. Of course other ratios can be determined, for example, 80-20, 70-30, etc. These anticipated weld deposit admixture ratios can be determined by using a look up table, or similar construct, which is preprogrammed based on anecdotal data which takes into account the various input parameters determined to be determinative of the admixture ratio. These can be, for example, joint design, joint dimensions, or any other parameter referenced above or used to determine admixture. Of course, embodiments of the present invention can use all, one or any combination of the above described weld process information to determine an admixture ratio. That is, the look up table can have preprogrammed admixture ratios for any combination of weld process parameters, and based on what is input the controllers uses its stored information to determine the admixture ratio. Further, in other exemplary embodiments the anticipated admixture can be entered by a user as described herein.

With the determined admixture ratio, the controller then utilizes the composition information from each of the workpiece material and the consumable to determine an expected final composition of the completed weld deposit 770. That is, the controller will use the respective amounts of each element from each of the workpiece and consumable, and using the determined ratio can determine the anticipated or expected composition of the final weld deposit. For example, the controller can take the amount of iron from each of the workpiece and consumable and combine them and using the relative amount of iron in each of the consumable and the workpiece, along with the determined ratio, can determine the amount of iron in the final weld deposit. This, of course, can be done for all of the compositional elements in each of the workpiece and consumable. Of course, it is known that in some instances some elements in a consumable will be lost in the arc welding process, for example in the creation of slag. The controller can be preprogrammed with stored data to take this loss into account.

Following the determination of the weld deposit determination 770, the controller can then determine an estimated property of the weld deposit 780. For example, using the determined composition, the controller can determine a weld deposit property such as an estimated or anticipated weld toughness, weld tensile strength, or weld yield strength. In some exemplary embodiments, the controller can, again, use a look up table, or the like, which has various weld properties that correspond to possible weld compositions. The look up table can be preprogrammed using anecdotal test data, or other data such that the estimated weld deposit properties are representative of the weld deposit properties of an actual weld bead with the corresponding composition. Of course, other methodologies or algorithms can be used without departing from the spirit or scope of the present invention.

Following the determination of the weld deposit properties 780 the controller compares the determined property or properties to the desired or user input weld deposit properties and displays a result of the comparison 790. The visual display of the data can simply display the determined weld deposit property, that is display the determined toughness, strength etc., but can also display the information as explained above. That is, if the determined property meets or exceeds a desired or entered property the display can provide an indication such as using a green light or other visual indication. If a minimal threshold is also entered/used by the controller the display can display a yellow indication of the determined property is between the minimum level and the desired level, and can display a red indication if the minimum desired threshold is not met. In other exemplary embodiments the controller can be programmed to lock out a welding operation if the determined weld deposit property is to be less than the a set or desired level.

Figure 8B:
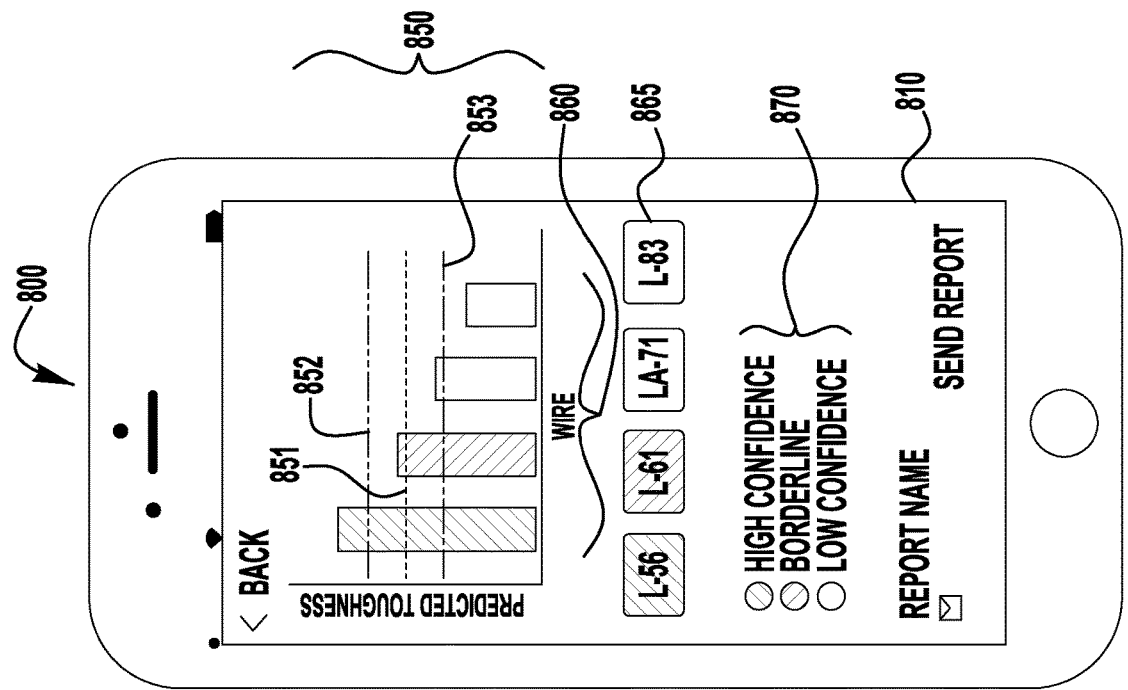
FIGS. 8A and 8B are diagrammatical representations of a user device according to an exemplary embodiment of the present invention.
Figure 8A:
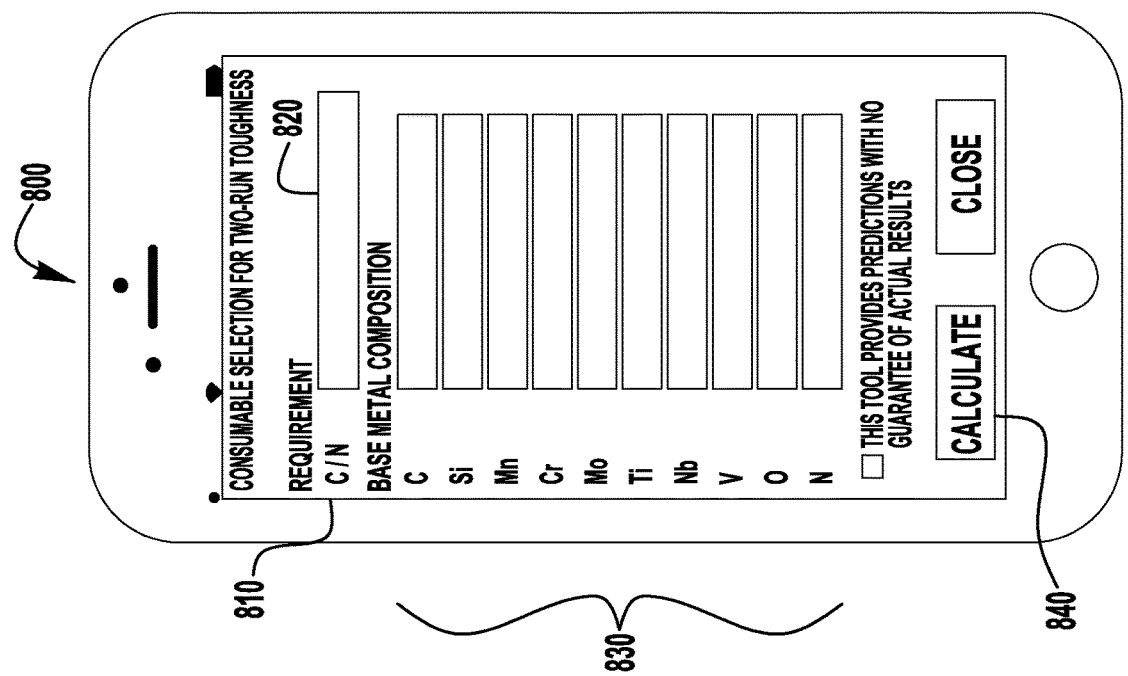

FIGS. 8A and 8B depict a further exemplary embodiment of a device 800 that can be used with embodiments of the present invention. As an initial matter, the device 800 can be any known type of computer, processor or CPU based device including the welding power supply itself, a laptop computer, a third party handheld device such as a smartphone or a tablet, or any other device capable of processing the information described herein and providing the ability to received user input data and/or display information to a user via a display 810. The embodiment shown in these figures is intended to be exemplary in nature and not limiting to the embodiments shown.

FIG. 8A depicts an exemplary user input screen for an embodiment of the invention. As described above, a user can enter a desired weld property in an entry field 820. In the embodiment shown, a user would enter a desired CVN toughness using a temperature and average toughness. As shown, this input information is for a "Two-Run" or two pass welding operation. Of course various different screens and input structures can be used for different types of welding operations. For example, a different screen can be used for a "Root Pass" etc. As indicated the user enters the desired property in the field 820. Of course, this can be auto-filled by selected a preprogrammed welding operation. Then the base metal composition fields 830 can be filled in. In the embodiments shown, the elements C, Si, Mn, Cr, Mo, Ti, Nb, V, O and N are shown. In some embodiments, these could be the only elements needed for appropriate operation of the embodiments described herein. That is, if the base material has other elements not shown here, there presence is not necessary for the analysis. In other embodiments, the display will simply show the detected elements of the base material and not have a set of predetermined fields as shown in FIG. 8A. The data fields 830 can then be filled via the spectrometer scanning discussed above and can be "auto-filled" from the spectrometer or can simply filled in by a user. It is noted that in some exemplary embodiments, the computer/controller of the system and/or the program running on the device 800 can have a plurality of present ranges for each of the elements that correspond to known materials that can be welded or are compatible with the consumable data within the system or device. In such embodiments, if the entered data in the one or more of the fields do not fall within the predefined limits, an error message can be displayed indicating to the user that the base material is not recognized or supported by the system. For example, in some embodiments base materials with a specific range % of carbon (C) are supported and if a base material is scanned/entered with either more or less carbon than recognized an error message will be display to the user. Once the data is entered, the user then can select "Calculate" 840 (or other similar process/function) which leads to the data shown in FIG. 8B.

In FIG. 8B the same device 800 is shown and it visually depicts a predicted parameter using embodiments described herein. For example, a predicted parameter image/graph 850 can be displayed. In the embodiment shown a predicted toughness is displayed having a desired requirement threshold 851—which corresponds to the data input in the field 820. Thus, a display of the desired property level or threshold 851 is displayed. Additionally, the system/controller can use a tolerance window having an upper 852 and lower 853 limit. The tolerance window represents a +/− threshold relative to the input level 851 that represents a degree of confidence in the resultant predicted results of the welding operation. The tolerance window, that is the % above and below the input level 851 can be predetermined for all applications, or in alternative embodiments the tolerance window, which can be reflective of the confidence level of the estimated results, is based on the user input data. For example, depending on the various combinations of input parameters, the anecdotal or experimental data can show changes in the confidence level of the results depending on the user input data, weld process data, etc. For example, in a first application with a first combination of input data the system can have a +/−10% confidence level in the estimated weld property results while in a second application with a second combination of input data a +/−15% confidence level can be used. These different confidence levels will be used to determine the upper and lower limits of the tolerance window. The various confidence levels can be determined based on experimental data and stored in the controller/system via a look up table or similar storage/recall structure.

As shown in FIG. 8B a plurality of bar graph indications 860 can be shown, or other similar indicator, to indicate the predicted weld quality based on different possible consumables that can be used for the weld. This can also be shown with other indicator types 865. As shown and discussed above, various indication techniques can be used to visually depict the predicted weld quality or attribute based on the combination of base material and consumable. For example, as shown the L-56 type consumable is predicted to exceed the upper threshold 852 of the tolerance window and is thus shown in green. Of course, other visual depictions or indications can be provided. The L-61 type consumable is shown as orange or yellow to indicate that the predicted weld property will exceed the desired input level but is below the upper limit 852 of the tolerance window. For each of the LA-71 and L-S3 type consumables, the indication is red in color indicating that it is likely that the use of those consumables will not result in a desired weld property. It is noted that in some embodiments all predicted weld properties below the desired level 851 are shown as red, even if they are above the lower tolerance window threshold 853. However, in other embodiments, all predicted results within the tolerance window can be shown as yellow/orange. The visual depiction utilized for any consumable/base material combination can also be based the degree of confidence of the predicted result. For example, where the predicted result has a first confidence level (for example in the level of +/−10%) any predicted result below the desired level 851 but above the lower limit 853 can be shown as yellow or "borderline," whereas if the confidence level is larger (for example +/−15%) then that same scenario would be shown as red or "low confidence." As shown, a color key 870 can also be shown to provide the user with appropriate guidance. In the embodiment shown the user could enter the various consumable available to him/her which are the consumables displayed. Alternatively, the system could display the consumables that are best suited for the application. Of course, in other exemplary embodiments, where the user enters a single consumable (or scans the consumable as described above), then only that consumable is shown with the appropriate visual indication.

In embodiments, if multiple consumables are shown then the user can select the consumable to be used and the selected combination can be stored and/or shared with other devices via known communication methods and systems.

FIG. 9 shows a representative visual depiction of a look up table or data structure that could be used with embodiments of the present invention. As shown, the table, which is for a particular set/combination of user input parameters, includes a plurality of base material compositions, which can be preprogrammed based on anticipated base materials to be experienced. Further, the table includes a plurality of available electrodes that are also available and stored in the database, and using anecdotal or experimental data to show the relatively CVN toughness at −40° F. This table is, of course, exemplary and would be populated differently for toughness at different temperatures and would be populated differently for different weld properties, such as yield strength, etc. As shown in FIG. 9, the various data fields show the different predicted toughness levels for each combination of base material and consumable. This data is then used to formulate the display shown in FIG. 8B. For example, if the desired toughness (entered by the user) is 70 ft-lb at −40° F., and the base material is #5, each of the consumables A, B, C, and D would be shown as green to provide a high level of confidence that the desired toughness will be reached. The electrode E could be shown as red to indicate low confidence that the toughness can be reached. The consumable F is shown as not compatible with the base material #5 and thus an error message, or the like, can be provided to the user to indicate that this consumable should not be used.

With the above process and described indication, if the indication is that the weld deposit property is not desirable, the user can select and scan a different consumable which may provide a better resultant weld, or simply select one of the consumables shown that provides a high level of confidence to give the desired property. Thus, embodiments of the present invention can aid in ensuring a proper consumable is selected for a given welding operation and a given weld workpiece.

In other exemplary embodiments, the controller can use the weld process data, the work piece composition and the desired weld deposit property (entered via a user) to determine a consumable or a number of different consumables that could be used to achieve the desired parameter(s). Thus a user could then be assured of proper consumable selection every time.

In the embodiments described above, the controller/processor that receives and analyzes the provided information is within the power supply. However, in other exemplary embodiments this can be done via a separate computer device, including a handheld device like a laptop, tablet, etc. The controller need not be in the power supply, but can be.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope described herein.

We claim:

1. A welding electrode selection system, comprising:
a spectrometer which scans a surface of a material to be welded and generates material scan data representative of a composition of said material to be welded in a welding operation;
a welding electrode selection device comprising a controller and a user input and display device,
wherein said welding electrode selection device receives said material scan data, a desired weld property for said welding operation and at least one welding parameter for said welding operation, and each of said material scan data, said desired weld property and said at least one parameter are provided to said controller,
wherein said controller determines a first predicted weld property for said welding operation utilizing each of said material scan data, said desired weld property, said at least one parameter and a first welding electrode, and a second predicted weld property for said welding operation utilizing each of said material scan data, said desired weld property, said at least one parameter and a second welding electrode,
wherein said welding electrode selection device compares each of said first predicted weld property and said second predicted weld property to said desired weld property.

2. The system of claim 1, wherein said welding electrode selection device is in a welding power supply.

3. The system of claim 1, where said welding electrode selection device is a mobile communication device.

4. The system of claim 1, where said spectrometer is coupled to said welding electrode selection device such that said material scan data is provided directly to said welding electrode selection device without a user intervention.

5. The system of claim 1, where said desired weld property is weld toughness.

6. The system of claim 1, wherein said desired weld property is one of weld toughness, yield strength, and tensile strength.

7. The system of claim 1, wherein said controller determines a predicted admixture ratio for said welding operation and uses said predicted admixture ratio in determining each of said predicted first and second weld properties.

8. The system of claim 7, wherein said predicted admixture ratio is determined using at least one of, or a combination of, a weld process type, a number of weld passes, a deposition rate, an electrode diameter, a wire feed speed, a heat input, a number of electrodes, a flux type, a shield gas, a workpiece thickness, a weld joint geometry, a weld joint type, a weld joint design, a welding current, a welding voltage, and a travel speed.

9. The system of claim 1, wherein said welding electrode selection device displays on said display device a visual representation of said comparison of said desired weld property to at least one of said first and said second predicted weld property.

10. The system of claim 1, wherein said controller compares at least one of said first and second predicted weld property to a tolerance window having an upper limit and a lower limit, where said tolerance window is representative of a degree of confidence of said at least one said first and second predicted weld property.

11. A welding electrode selection system, comprising:
a spectrometer which scans a surface of a material to be welded and generates material scan data representative of a composition of said material to be welded in a welding operation;
a welding electrode selection device comprising a controller and a user input and display device,
wherein said welding electrode selection device receives said material scan data, a desired weld property for said welding operation and at least one welding parameter for said welding operation, and each of said material scan data, said desired weld property and said at least one parameter are provided to said controller,
wherein said controller determines a predicted weld property for said welding operation utilizing each of said material scan data, said desired weld property, said at least one parameter and a selected welding electrode, wherein said welding electrode selection device compares said predicted weld property to said desired weld property and a visual display of said comparison is displayed on said display device.

* * * * *